(12) United States Patent
Uppal et al.

(10) Patent No.: US 11,410,445 B2
(45) Date of Patent: Aug. 9, 2022

(54) SYSTEM AND METHOD FOR OBTAINING DOCUMENTS FROM A COMPOSITE FILE

(71) Applicant: Infrrd Inc, San Jose, CA (US)

(72) Inventors: Akshay Uppal, Bengaluru (IN); Shreyas Sudeendra, Bengaluru (IN)

(73) Assignee: Infrrd Inc., San Jose, CA (US)

( * ) Notice: Subject to any disclaimer, the term of this patent is extended or adjusted under 35 U.S.C. 154(b) by 0 days.

(21) Appl. No.: 17/060,103

(22) Filed: Oct. 1, 2020

(65) Prior Publication Data

US 2021/0019512 A1 Jan. 21, 2021

(51) Int. Cl.
| | |
|---|---|
| G06V 30/413 | (2022.01) |
| G06F 16/93 | (2019.01) |
| G06F 40/106 | (2020.01) |
| G06F 40/114 | (2020.01) |
| G06V 10/46 | (2022.01) |
| G06F 40/149 | (2020.01) |

(52) U.S. Cl.
CPC ............ G06V 30/413 (2022.01); G06F 16/93 (2019.01); G06F 40/106 (2020.01); G06F 40/114 (2020.01); G06V 10/464 (2022.01); G06F 40/149 (2020.01)

(58) Field of Classification Search
CPC .. G06K 9/4676; G06V 30/413; G06V 10/464; G06F 40/114
See application file for complete search history.

(56) References Cited

U.S. PATENT DOCUMENTS

| | | | | |
|---|---|---|---|---|
| 2019/0294874 A1* | 9/2019 | Orlov | ................... | G06K 9/6218 |
| 2020/0097718 A1* | 3/2020 | Schafer | ................ | G06K 9/6256 |
| 2020/0125630 A1* | 4/2020 | Sanghavi | ............ | G06K 9/00463 |
| 2020/0311542 A1* | 10/2020 | Wang | ....................... | G06N 3/04 |

* cited by examiner

Primary Examiner — Scott T Baderman
Assistant Examiner — Seung Woon Jung

(57) ABSTRACT

A system for obtaining documents from a composite file comprising a stream of multiple pages is provided. The system may comprise one or more processors configured to receive the composite file comprising the multiple pages and split the composite file to obtain individual pages of the composite file, wherein image of each of the individual pages and image vector for each of the individual pages from the image of the respective page may be obtained. The processor may further obtain text present in each of the individual pages and text vector for each of the individual pages from the text of the respective page. The processor may further determine continuity pattern between pages that are consecutive based on the image vector and the text vector of the consecutive pages and may categorize the consecutive pages as belonging to the same document in case the determined continuity pattern between the consecutive pages indicate that the consecutive pages belong to the same document.

9 Claims, 5 Drawing Sheets

SYSTEM AND METHOD FOR OBTAINING DOCUMENTS FROM A COMPOSITE FILE

BACKGROUND

Unless otherwise indicated herein, the materials described in this section are not prior art to the claims in this application and are not admitted to being prior art by inclusion in this section.

FIELD

The subject matter in general relates to page stream segmentation. More particularly, but not exclusively, the subject matter relates to splitting composite documents by learning continuity patterns of plurality of pages.

DISCUSSION OF THE RELATED ART

Most businesses receive documents such as invoices, receipt records, payroll reports and paid bills, among many others. Such documents may be scanned and stored as a single composite file. Typically, the composite file needs to be separated into the individual documents for various purposes. Splitting composite files involves considerable manual efforts.

With the advent of deep learning techniques, time can be saved by automatically separating composite documents. Page stream segmentation is the process of automatically splitting composite files into separate documents. The composite file comprising multiple documents may be fed to a deep learning network, wherein the network may study the plurality of consecutive pages to identify whether the pages belong to the same document or a different document. If the pages belong to different documents, then the composite file may be separated into plurality of different documents.

In one of the conventional approaches, page stream segmentation is based on studying the structural data and the character data of plurality of pages. The structural data represents the structural information of the pages such as header information, footer information and so on. The character data represents the font, size, position information of the text. The structural data and the character data of plurality of pages may be compared and the pages may be separated based on the comparison output. The instant approach may fail when the character data and the structural data of the pages of the composite document is the same. That is to say, the instant approach may fail when the composite file comprises documents with the same text font size, header type, footer type and so on.

In view of the foregoing discussion, there is a need for improved technical solution for page stream segmentation.

SUMMARY

In an aspect, a system for obtaining documents from a composite file comprising a stream of multiple pages is provided. The system may comprise one or more processors configured to receive the composite file comprising the multiple pages and split the composite file to obtain individual pages of the composite file, wherein image of each of the individual pages and image vector for each of the individual pages from the image of the respective page may be obtained. The processor may further obtain text present in each of the individual pages and text vector for each of the individual pages from the text of the respective page. The processor may further determine continuity patterns between pages that are consecutive based on the image vector and the text vector of the consecutive pages and may categorize the consecutive pages as belonging to the same document in case the determined continuity pattern between the consecutive pages indicate that the consecutive pages belong to the same document.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Figure 1:
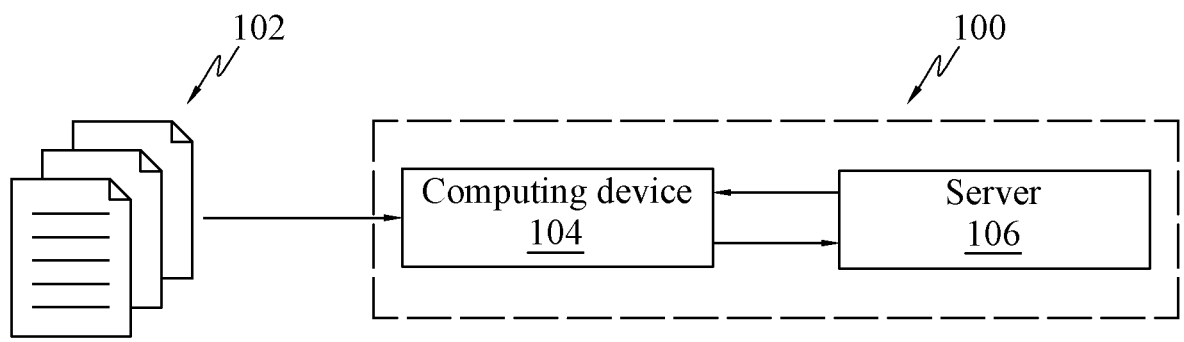
FIG. 1 illustrates a system 100, in accordance with an embodiment.

Referring to the figures, and more particularly to FIG. 1, a system 100 for obtaining documents from a composite file comprising a stream of multiple pages is provided. The system 100 may obtain the documents by studying the continuity pattern across plurality of consecutive pages. The system 100 may comprise a computing device 104 and a server 106.

In an embodiment, the composite file may be configured to comprise plurality of different documents. As an example, the composite file may comprise invoices, receipts, bank statements and income statements, among many others.

In an embodiment, the computing device 104 may include smart phone, PDA, tablet PC, notebook PC, desktop, kiosk or laptop, among like computing devices.

In an embodiment, the server 106 may be implemented in the form of one or more processors with a memory module coupled to one or more processors with one or more communication modules. The server 106 may communicate with one or more external sources and one or more computing devices 104 through communication modules.

Figure 2:
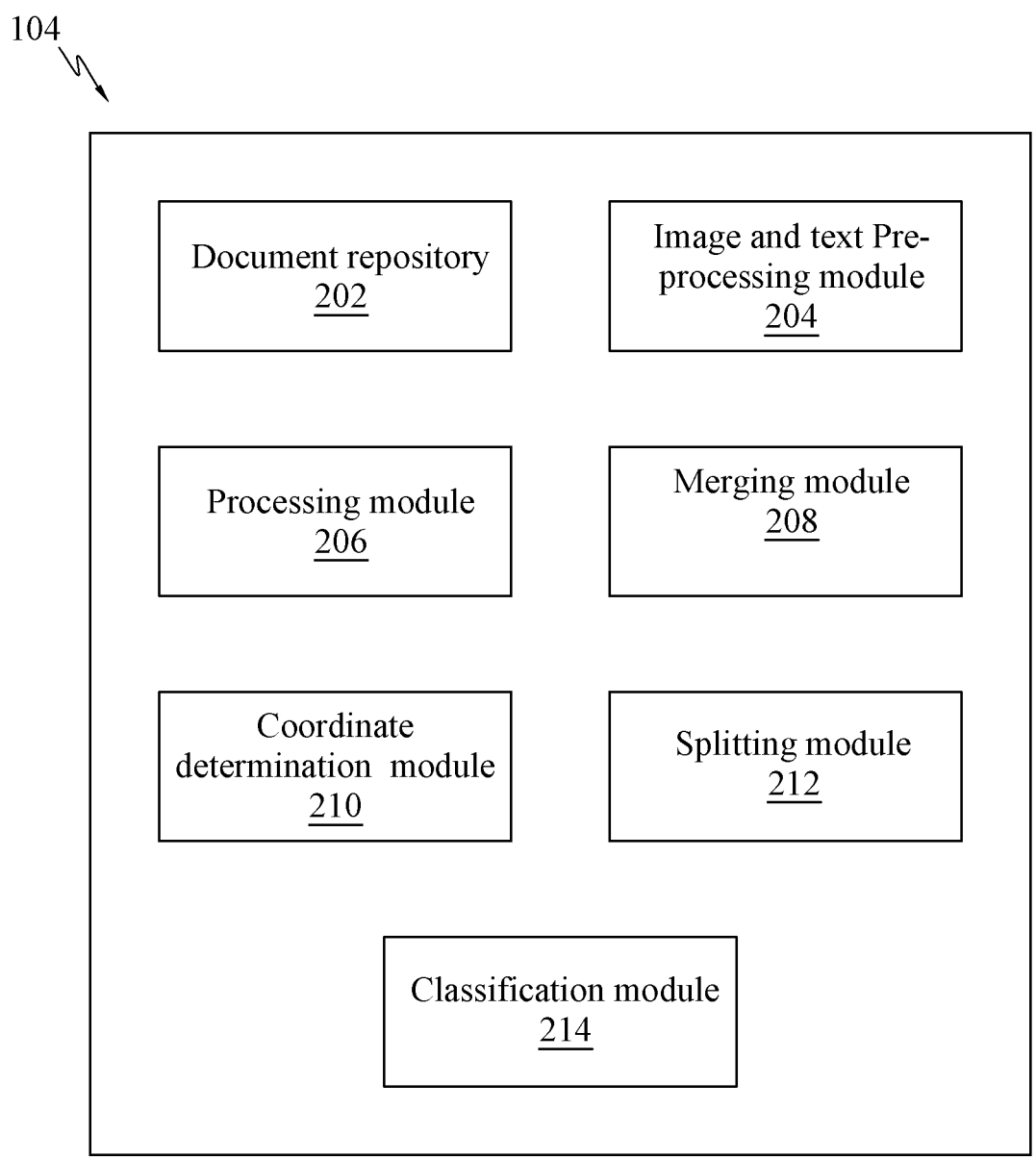
FIG. 2 illustrates various modules of a computing device 104, in accordance with an embodiment.

Referring to FIG. 2, various modules of the computing device 104 are disclosed, in accordance with an embodiment.

In an embodiment, the computing device 104 may comprise a document repository 202, an image and text pre-processing module 204, processing module 206, a merging module 208, a coordinate determination module 210, a splitting module 212 and a classification module 214.

In an embodiment, the document repository 202 may comprise plurality of data documents that may be used for training the system. The data documents may be of different types. The plurality of different types of data documents may further include plurality of subtypes of data documents. That is to say, the document repository 202 may comprise documents type 1, type 2 and so on, wherein the type 1 data documents may include subtype 1a, subtype 1b and so on and type 2 data documents may include subtype 2a, subtype 2b and so on. As an example, the type 1 data document may be invoices and the subtype 1a may be retail invoice, subtype 1b may be salary invoice. The data documents may be used to train the computing device 104 to identify the type of document and to classify the documents.

In an embodiment, the image and text pre processing module 204 may be configured to split the composite file into individual pages. The image and text pre processing module 204 may receive the digital image of the document and may split the document into individual pages. The image and text pre processing module 204 may then convert the received composite file into image format, when the received composite file is in any other format. The other formats that may be received by the image and text pre processing module 204 may be .PDF, .XML and .DOCX, among others. As an example, when the image and text preprocessing module 204 receives a composite file, comprising 100 pages, in .PDF format, the image and text preprocessing module 204 may first split the composite file into 100 individual pages. The image and text preprocessing module 204 may then convert the .PDF file into an image file In an embodiment, the image and text preprocessing module 204 may further comprise image processing and text processing algorithms to convert the individual pages into corresponding image and text, respectively. That is to say, the image and text pre processing module 204 may first covert each individual page into its corresponding image component. The image and text preprocessing module 204 may then extract text component from each individual page. The image and text pre processing module 204 may comprise an OCR (Optical Character Recognition) unit for converting the pages into its text component. The OCR unit may recognise characters or words representations in the digital image.

In an embodiment, the processing module 206 may be configured to comprise a deep neural network for identifying a continuity pattern across plurality of consecutive pages received from the image and text pre-processing module 204. The image and text pre-processing module 204 may feed the image components and the text components of plurality of consecutive pages to the deep neural network.

The deep neural network may learn best way of representation of the image features and the best way of representation of the text features across the consecutive pages. By learning the best way of representation of the image features and the best way of representation of the text features, the deep neural network may study the continuity pattern across plurality of consecutive pages and may identify the pages belonging to the same document. As an example, the deep neural network may be fed with the text and image components of a first page and a second page. The deep neural network may learn the continuity pattern across the first and the second page and may identify that the first and the second page belongs to the same document. The deep neural network may then be fed with the text and image components of the second page and the third page. The deep neural network may learn the continuity pattern across the second and the third page and may identify that the second and the third page belongs to the same document. Similarly by repeating the process the deep neural network may identify that the pages 1-3 belong to a first document, pages 4-5 belongs to a second document and so on.

In an embodiment, the merging module 208 may merge the pages that may belong to the same document. Considering the example above, the merging module 208 may merge pages 1-3 to form the first document, 4-5 to form the second document and so on.

In an embodiment, the coordinate determination module 210 may be configured to comprise a second deep learning neural network to identify multiple documents within one page. The coordinate determination module 210 may receive the image component from the image and text pre-processing module 204 and may identify multiple documents within the individual pages. As an example, the individual page may comprise plurality of documents such as invoice, bill payments and so on. The coordinate determination module 210 may then predict the coordinates of each of the individual documents. The coordinates of a first document may be $[X_{tl}, Y_{tl}, X_{tr}, Y_{tr}, X_{bl}, Y_{bl}, X_{br}, Y_{br}]$, wherein $X_{tl}$ and $Y_{tl}$ may be the X and Y axis coordinate of the top-left corner of the document, $X_{tr}$ and $Y_{rl}$ may be the X and Y axis coordinate of the top-right corner of the document $X_{bl}$ and $Y_{bl}$ may be the X and Y axis coordinate of the bottom-left corner of the document and $X_{br}$ and $Y_{br}$ may be the X and Y axis coordinate of the bottom-right corner of the document. The coordinate determination module 210 may be configured to comprise a third deep learning neural network to predict the coordinates of each of the individual documents. The second deep learning neural network may be a Convoluted Neural Networks (CNN) or any other appropriate deep-learning algorithms.

In an embodiment, the splitting module 212 may be configured to crop the documents based on the document coordinate information received from the coordinate determination module 210. The splitting module 212 may further comprise a second image processing algorithm for skew detection. The splitting module 212 may align the cropped documents on skew detection (de-skew process). De-skew process is a process of straightening a misaligned image.

In an embodiment, the classification module 214 may be configured to classify the plurality of merged documents received from the merging module 208. Further, the classification module 214 may classify the documents received from the splitting module 212. The classification module 214 may receive the plurality of merged documents from the merging module 208 and splitting module 212. The classification module 214 may comprise a first deep learning model for extracting the text from each page of the document. The first deep learning model may then combine the text from each page of the document to generate a text file. The second deep learning model may then learn the contextual meaning of the text file to classify the document. The documents may be classified into a plurality of document types. The document types may be, but not limited to, invoices, bill payment receipts, bank statements. The first deep learning neural network may be a Convoluted Neural Networks (CNN) or any other appropriate classification algorithms. The first deep learning model is a custom neural network architecture which emulated the n-gram approach and may take an ensemble of the features, and finally classify the different documents.

Having discussed the various modules involved in obtaining documents from a composite file, training of the processing module 206, coordination determination module 210 and the classification module 214 is discussed hereunder.

For training the processing module 206 for identifying the pages belonging to the same document, the deep neural network may be fed with data documents. Each document may comprise plurality of pages of the same type. As an example, one data document may be an invoice with 3 pages, another data document may be a bank statement with 5 pages. The deep neural network may comprise 4 input layers. The image of first page of the data document may be fed to the first input layer of the deep neural network, text of first page of the data document may be fed to the second input layer of the deep neural network, image of consecutive page of the data document may be fed to the third input layer of the deep neural network and the text of the consecutive page of the data document may be fed to the fourth input layer of the deep neural network. The deep neural network may study the continuity pattern across the two pages of the data document by learning the best way of representation of the image features and the best way of representation of the text features. That is to say, the deep neural network may first learn the best features to represent the text and image of each page from the entire training data, which may be then compared with the consecutive pages to identify whether the consecutive pages belong to the same document. Similarly, all the pages of the data document may be fed to the deep neural network and the deep neural network may study the continuity pattern across all the pages of the data document. The deep neural network may be trained to learn the continuity pattern of plurality of types of documents by feeding plurality of types of documents to the deep neural network.

For training the classification module 214, the same data documents used for training the processing module 206 may be fed to the first deep learning model. The data documents may be labelled. As an example, the type 1 documents may be labelled as invoices, type 2 may be labelled as bank statements and so on. The first deep learning model may be fed with text files of each data document and the first deep learning model may learn the contextual patterns emulating an ensemble of n-gram approach. By learning the contextual pattern of the pages and the label of the data document, the classification module 214 may be trained to classify the plurality of documents.

For training the coordination determination module 214, the third deep learning model may be fed with data documents with bounding boxes. That is to say, the data documents may include plurality of documents within one page and each document may be bounded with bounding boxes. The third deep learning algorithm may learn the pattern within each bounding box and may learn to predict the coordinates of the bounding boxes.

Having discussed the various modules involved in obtaining documents from a composite file, a flowchart describing the steps involved in determining the continuity pattern across plurality of consecutive pages is discussed hereunder.

Figure 3A:
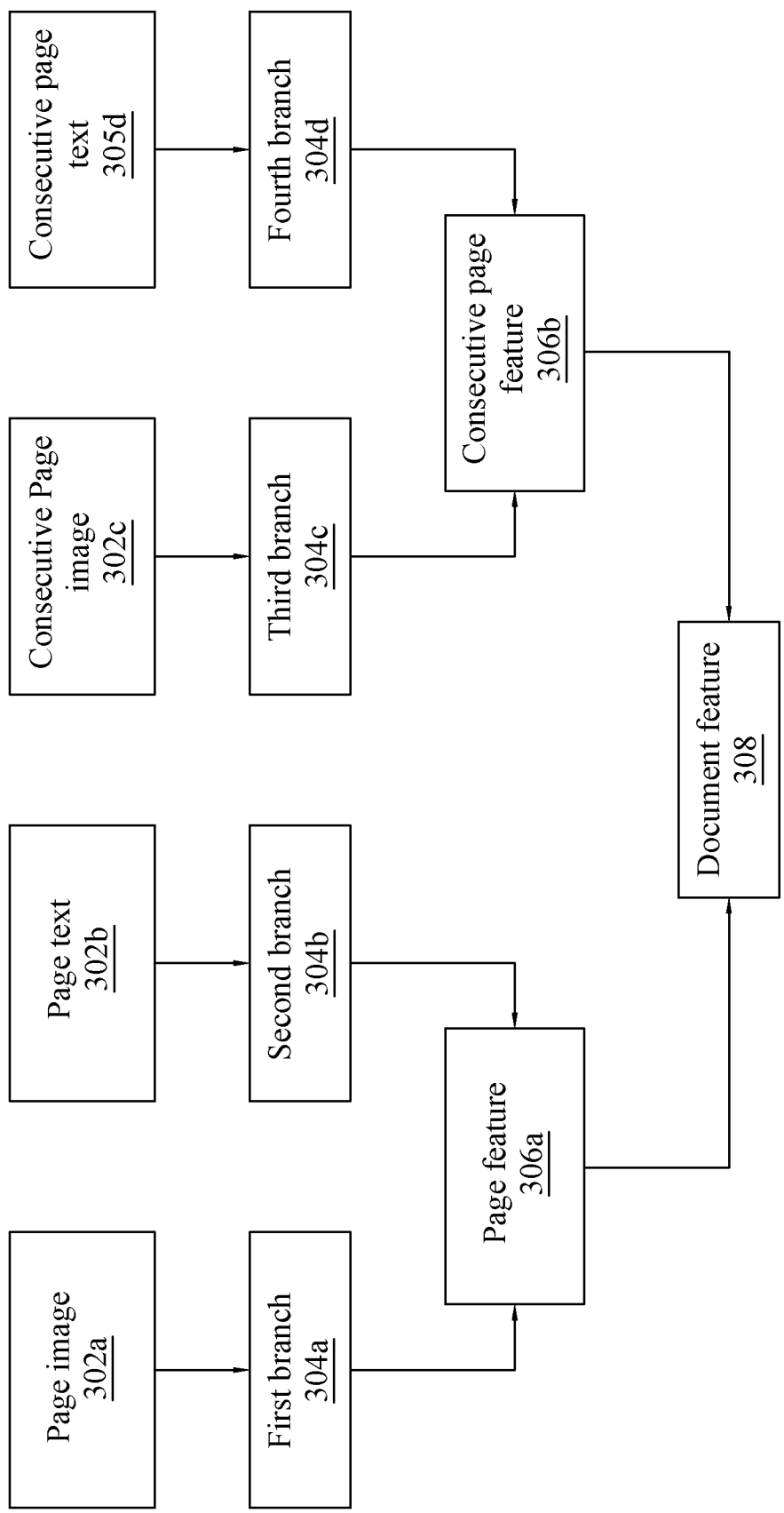
FIG. 3A is a flowchart illustrating the steps involved in learning the continuity pattern across plurality of pages, in accordance with an embodiment.
Figure 3B:
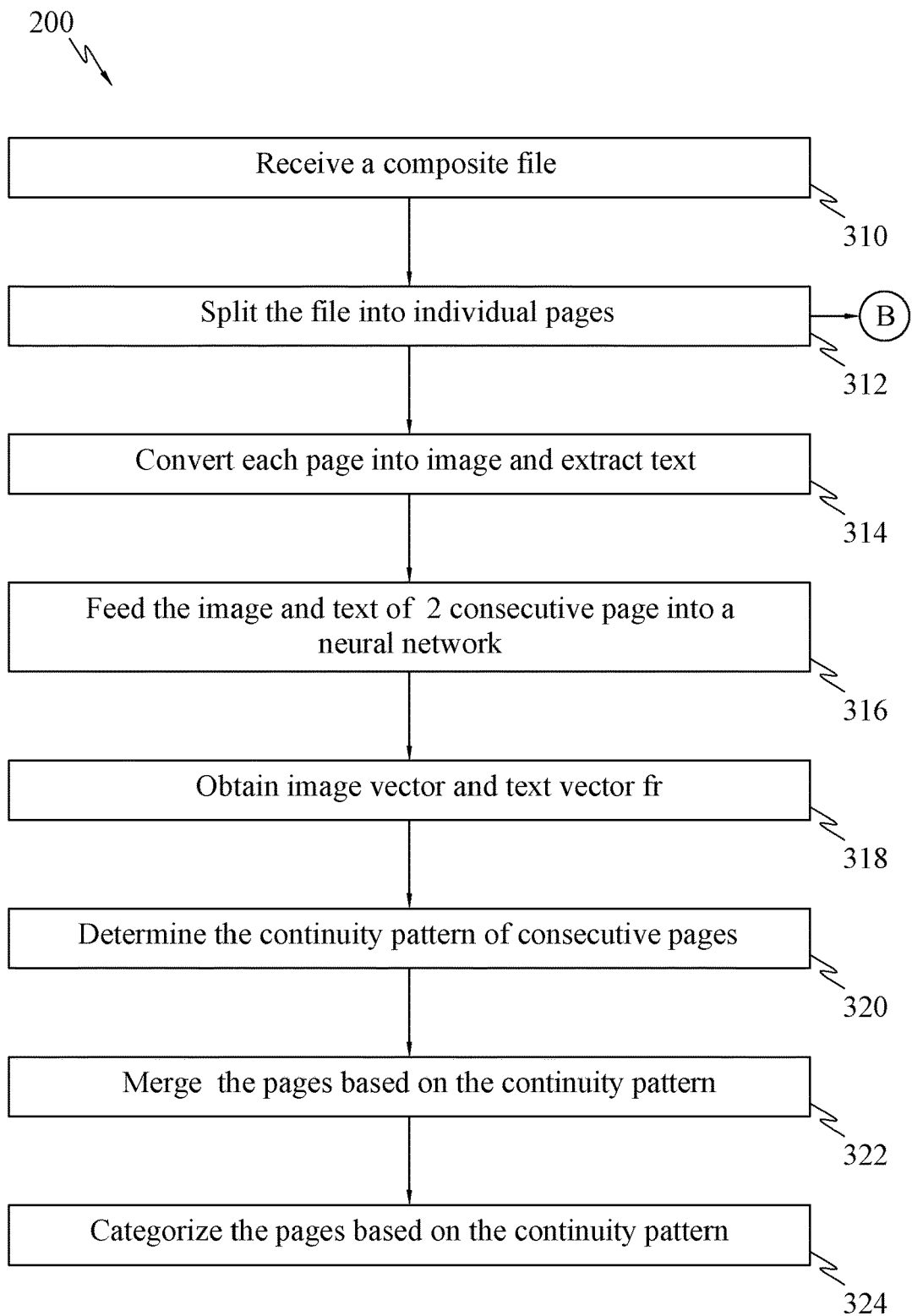
FIG. 3B is a flowchart illustrating the steps involved in obtaining individual documents from a composite file, in accordance with an embodiment.

The processing module 206 may determine the continuity pattern by feeding the image component and the text component of 2 consecutive pages to the deep neural network. The deep neural network may comprise 4 parallel input branches. Referring to FIG. 3A, at step 302*a* and 302*b*, the converted image (image component) and the extracted text (text component) of a page may be fed to the first branch and the second branch, respectively. Similarly, at step 302*c* and 302*d*, the converted image (image component) and the extracted text (text component) of its consecutive page may be fed to the third branch and the fourth branch, respectively. As an example, the image component of the first page may be fed to the first branch, the text component of the first page may be fed to the second branch, the image component of the second page (consecutive page) may be fed to the third branch and the text component of the second page may be fed to the fourth branch.

At step 304*a* and 304*c*, the first branch and the third branch may reduce the image size of each page (first input page and its consecutive input page). The dimensions of the reduced image may be, but not limited to 224×224. The deep neural network may further extract features of each page to vectorize the image of each page to a 1×256 vector size. The image vector represents the layout information of each page.

At step 304*b* and 304*d*, the second branch and the fourth branch may convert the text component of the page and the consecutive page to n-grams, wherein the n-grams may be embedded in a vector space and may be represented in vector space with a vector size 1×256. The text vector represents the font, size information of each page.

At step 306*a*, the image vector and text vector of the first page may be combined to generate the page features of the first page of a vector size 1×512. Similarly, at step 306*ab*, the image vector and text vector of the consecutive page may be combined to generate the page features of the consecutive page.

At step 308, the page features of the first page and the consecutive pages may be combined to generate document features of vector size 1×1024 vector size. The deep neural network may learn the continuity pattern across the document features to identify whether the page and its consecutive page belongs to the same document or different document.

Having discussed steps involved in determining the continuity pattern across plurality of consecutive pages, a flowchart describing the steps involved in obtaining individual documents from the composite file is explained hereunder.

At step 310, the composite file may be received by the image and text preprocessing module 204.

At step 312, the image and text preprocessing module 204 may determine the type of format of the file. If the received file is not in image format, then the image and text pre processing module 204 may convert the composite file into the image format. The composite file may then be split into its individual pages by the image and text pre processing module 204. As an example, consider the file comprising 100 pages. The segmentation module 204 may split the file into 100 individual pages.

At step 314, the text and image pre-processing module 204 may further convert each page into its corresponding image component. Further the text and image pre-processing module 204 may extract the text component of each page using OCR techniques. The text and image pre-processing module 204 may then communicate the image components and text components to the deep neural network at step 316 and may communicate the image components of each page to the coordinate determination module (step B).

At step 316, the converted image component and the extracted text component of 2 consecutive pages may be fed to the 4 input branches of the deep neural network as explained above with respect to FIG. 3A.

At step 318, the deep neural network may combine the image vector and text vector of the first input page and the image vector and text vector of the consecutive input page, to generate page vectors of the first input page and the consecutive input page, respectively. The deep neural network may further combine page vectors of the first input page and the consecutive input page to generate the document vector.

At step 320, the deep neural network may study the continuity pattern across the document vector to determine whether the pages belong to the same document or different documents. Step 314-320 may be repeated for all the individual pages of the composite file. The processing module 206 may then identify the pages belonging to the same documents. As an example, the processing module 206 may determine that the pages 1-3 belong to the first document, pages 3-5 belong to the second document and so on.

At step 322, the merging module 310 may merge the pages belonging to the same documents. Considering the above example, the merging module 208 may merge pages 1-3 to form the first document, pages 4-5 to form the second document and so on. On merging the identical pages, the merged pages may be communicated to the classification module 216.

At step 324, the classification module 214 may classify the merged documents into appropriate document types. Considering the above example, the first document may be classified as invoice, the second document may be classified as bill payment receipt and so on.

Figure 3C:
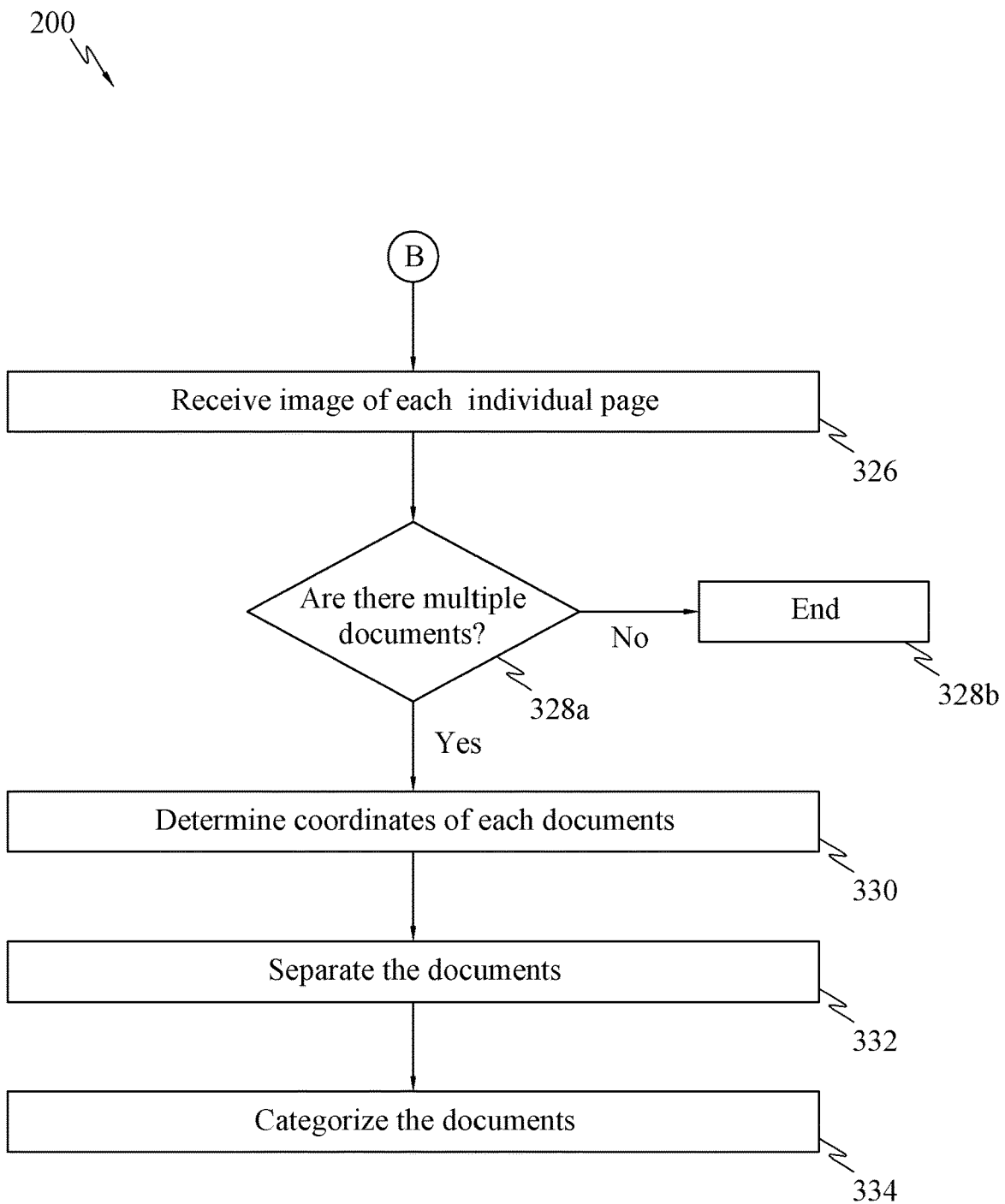
FIG. 3C is a flowchart illustrating the steps involved in splitting a multi document page, in accordance with an embodiment.

Referring to FIG. 3C, at step 326, the coordinate determination module 210 may receive the image component of each individual page from the text and the image pre processing module 204.

At step 328, the coordinate determination module 210 may check whether the individual pages consist of multiple documents. As an example, a single individual page may comprise one invoice and 2 different bill payment receipts. If the individual page does not comprise more than 1 document, then the process may end at step 328b. If the coordinate determination module 210 identifies more than one document in the individual pages, then the process may continue to step 330.

At step 330, the coordinate determination module may predict the coordinates of each of the documents within one page.

At step 332, the splitting module 212 may separate the plurality of documents within the individual page based on the coordinates of the documents.

At step 322, the separated documents may be fed to the classification module 214, wherein the classification module 214 may classify the separated documents into appropriate document types.

Figure 4:
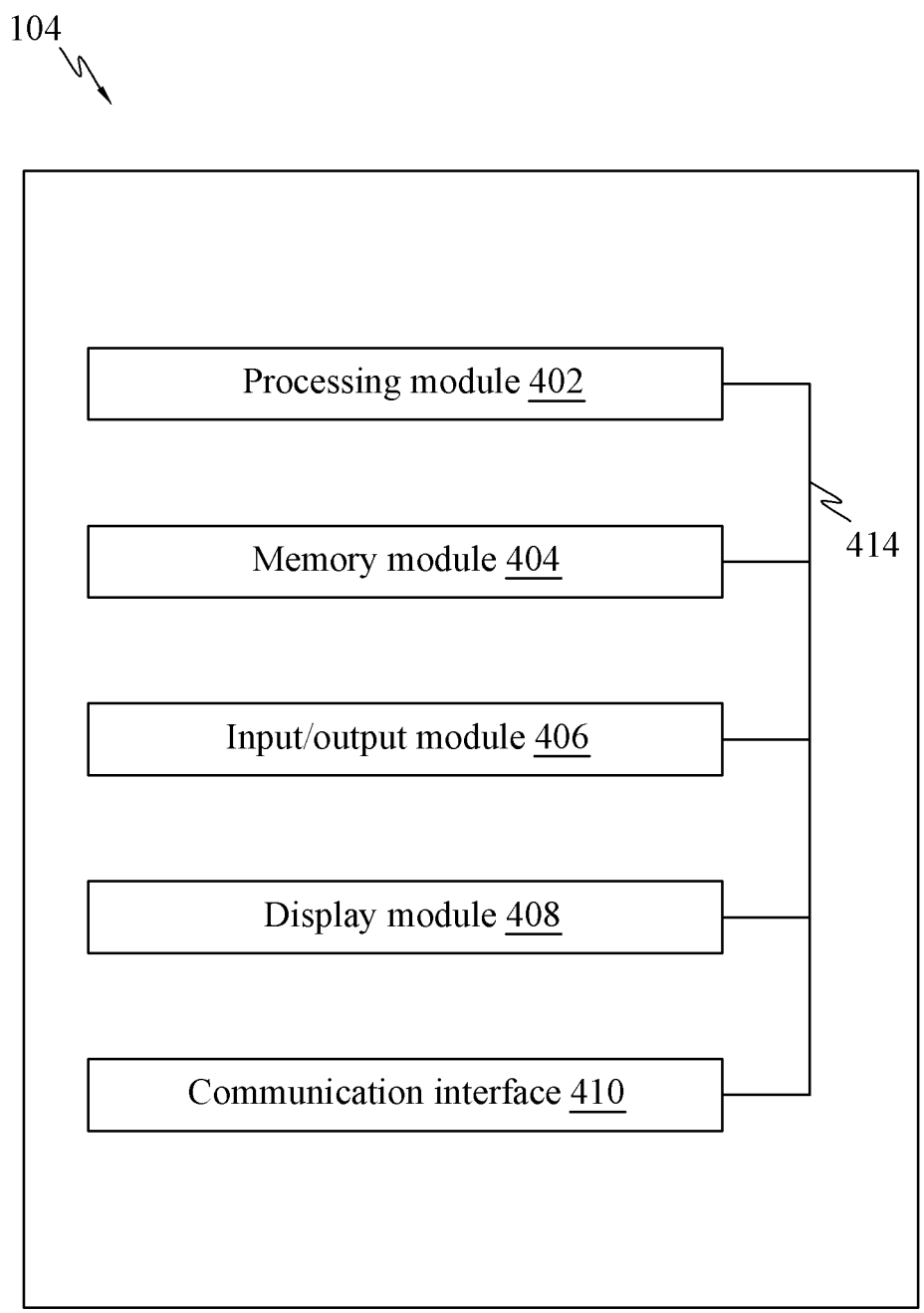
FIG. 4 illustrate a hardware configuration of the computing device 104, in accordance with an embodiment

FIG. 4 illustrates a hardware configuration of the computing device 104, in accordance with an embodiment.

In an embodiment, the computing device 104 may include one or more processors 10. The processor 402 may be implemented as appropriate in hardware, computer-executable instructions, firmware, or combinations thereof. Computer-executable instruction or firmware implementations of the processor 402 may include computer-executable or machine-executable instructions written in any suitable programming language to perform the various functions described. Further, the processor 402 may execute instructions, provided by the various modules of the computing device 104.

In an embodiment, the computing device 104 may include a memory module 404. The memory module 404 may store additional data and program instructions that are loadable and executable on the processor 402, as well as data generated during the execution of these programs. Further, the memory module 404 may be volatile memory, such as random-access memory and/or a disk drive, or non-volatile memory. The memory module 404 may be removable memory such as a Compact Flash card, Memory Stick, Smart Media, Multimedia Card, Secure Digital memory, or any other memory storage that exists currently or will exist in the future.

In an embodiment, the computing device 104 may include an input/output module 406. The input/output module 406 may provide an interface for inputting devices such as keypad, touch screen, mouse, and stylus among other input devices; and output devices such as speakers, printer, and additional displays among others.

In an embodiment, the computing device 104 may include a display module 408 may be configured to display content. The display module 408 may also be used to receive an input from a user. The display module 408 may be of any display type known in the art, for example, Liquid Crystal Displays (LCD), Light emitting diode displays (LED), Orthogonal Liquid Crystal Displays (OLCD) or any other type of display currently existing or may exist in the future.

In an embodiment, the computing device 104 may include a communication interface 410. The communication interface 410 may provide an interface between the computing device 104, server 106 and external networks. The communication interface 410 may include a modem, a network interface card (such as Ethernet card), a communication port, or a Personal Computer Memory Card International Association (PCMCIA) slot, among others. The communication interface 410 may include devices supporting both wired and wireless protocols.

In an embodiment, the server 106 may include processors, memory module, the input/output module and communication interface. The processors of the server 106 may execute various instructions of the modules provided in the server 106.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for obtaining documents from a composite file comprising a stream of multiple pages, the system comprising one or more processors configured to:

receive the composite file comprising the multiple pages;

split the composite file to obtain individual pages of the composite file;

obtain image of each of the individual pages;

feed at least one of the split individual pages, into a deep learning model;

identify whether the individual page fed into the deep learning model comprises multiple documents;

if the individual page fed into the deep learning model comprises multiple documents, coordinates of at least one of the documents within the individual page are determined;

extract the identified document based on the determined coordinates;

obtain image vector for each of the individual pages from the image of the respective page;

obtain text present in each of the individual pages;

obtain text vector for each of the individual pages from the text of the respective page;

combine the image vector and the text vector of at least one of the individual page and image vector and text vector of its consecutive page to generate a page vector of the at least one of the individual pages and its consecutive page;

combine the page vector of the at least one of the individual pages and its consecutive page to generate a document vector;

determine continuity pattern between pages that are consecutive by processing the generated document vector to determine the continuity pattern across the generated document vector; and categorize the consecutive pages as belonging to the same document in case the determined continuity pattern between the consecutive pages indicates that the consecutive pages belong to the same document.

2. The system of claim 1, wherein the processor is configured to combine the consecutive pages on determining that the consecutive pages belong to the same document.

3. The system of claim 2, wherein the processor is configured to:

feed at least one of the combined documents into a classification module; and classify the document based on the text and the image layout.

4. The system of claim 1, wherein the processor is configured to:

feed at least one of the extracted document into a classification module; and classify the extracted document based on the text.

5. The system of claim 1, wherein the processor is configured to reduce the dimension of the image before obtaining image vector.

6. The system of claim 1, wherein the processor is configured to obtain the image vector of 1×256 vector size.

7. The system of claim 6, wherein the processor is configured to obtain the text vector of 1×256 vector size.

8. The system of claim 7, wherein the processor is configured to combine the image vector and the text vector to obtain a vector of 1×512 vector size.

9. The system of claim 8, wherein the document vector is of a size 1×1024.

* * * * *